United States Patent
Keuth

(10) Patent No.: US 7,112,155 B2
(45) Date of Patent: Sep. 26, 2006

(54) DIRECTLY DRIVEN DRIVING AXLE HAVING TWO DRIVE MOTORS

(75) Inventor: Karl-Heinz Keuth, Halver (DE)

(73) Assignee: Ewald Speth Antriebstechnik GmbH, (DE)

( * ) Notice: Subject to any disclaimer, the term of this patent is extended or adjusted under 35 U.S.C. 154(b) by 143 days.

(21) Appl. No.: 10/503,409

(22) PCT Filed: Jan. 30, 2003

(86) PCT No.: PCT/DE03/00253

§ 371 (c)(1),
(2), (4) Date: Jul. 30, 2004

(87) PCT Pub. No.: WO03/064198

PCT Pub. Date: Aug. 7, 2003

(65) Prior Publication Data

US 2005/0148421 A1  Jul. 7, 2005

(30) Foreign Application Priority Data

Jan. 31, 2002  (DE) .......................... 202 01 379 U
Sep. 2, 2002  (DE) .......................... 202 13 670 U

(51) Int. Cl.
*F16H 3/72* (2006.01)
(52) U.S. Cl. ....................................................... 475/6
(58) Field of Classification Search ............... 180/65.6, 180/6.5; 475/6, 5, 149
See application file for complete search history.

(56) References Cited

U.S. PATENT DOCUMENTS

| 4,803,897 A | * | 2/1989 | Reed .............................. 475/6 |
| 5,372,213 A | * | 12/1994 | Hasebe et al. ............. 180/65.6 |
| 5,396,968 A | * | 3/1995 | Hasebe et al. ............. 180/65.6 |
| 6,024,182 A | * | 2/2000 | Hamada et al. ............ 180/6.28 |

FOREIGN PATENT DOCUMENTS

| DE | 579 353 | 6/1933 |
| DE | 37 25 620 | 2/1989 |
| DE | 44 21 428 | 7/1995 |
| DE | 195 34 383 | 3/1997 |
| DE | 197 32 637 | 2/1999 |
| DE | 200 10 563 | 10/2000 |

* cited by examiner

*Primary Examiner*—Dirk Wright
(74) *Attorney, Agent, or Firm*—Robert W Becker & Associates; Robert W Becker

(57) ABSTRACT

The invention relates to a driving axle for electric motor-driven vehicles provided with at least one electric motor mounted on the axle and drive shafts driven by the motor shaft thereof with a planetary gear step inserted therebetween, connected to the output shafts bearing the wheels resting on the drive axle with a braking device and another planetary gear inserted therebetween. The invention is characterised in that two controlled asynchronous motors (10, 11) are disposed on the axle, said motors working separately and being controlled by a common control in the working functions thereof. The motor shafts (13) of both asynchronous motors (10, 11) are connected respectively by the planetary gear step (15, 16, 17) to the drive shaft (19) driving the downstream output shaft (24).

12 Claims, 3 Drawing Sheets

DIRECTLY DRIVEN DRIVING AXLE HAVING TWO DRIVE MOTORS

BACKGROUND OF THE INVENTION

The invention relates to a drive axle for electric motor driven vehicles having at least one electric motor disposed on the axle and having drive shafts that are driven by the motor shafts thereof accompanied by interposition of a planetary gearing stage, which drive shafts are connected with the output shafts that carry the wheels seated on the drive axle, accompanied by the respective interposition of a brake assembly as well as a further planetary gearing.

A drive axle having the aforementioned features is disclosed in DE 200 10 563 U1. With the known axle a single three-phase motor is provided as a drive for both drive shafts, and the output shafts that are coupled thereon accompanied by the interposition of a brake assembly and a planetary gearing, and which drive the wheels seated on the axle; the single motor shaft of the three-phase motor is connected with the two drive shafts, accompanied by the interposition of a differential gearing, whereby one of the two drive shafts is guided through a bore formed in the motor shaft on that side of the three-phase motor that is opposite the motor shaft. With the known axle, inserted between motor shaft and the two drive shafts is a planetary differential gearing stage that combines a gearing stage and the necessary differential, in a special structural embodiment, in a structural unit.

The known drive axle has the drawback that the differential, required due to the drive concept using a single three-phase motor, despite the approach proposed in DE 20 10 563 U1, limits the output of the drive axle with regard to torque and final speed of the driven wheels, and in addition causes high operating noises during the operation of the axle. The planetary differential gearing stage that is combined in a structural unit additionally has a complicated design and manufacture. Furthermore, since a differential lock is dispensed with, the vehicle comes to a stop if a wheel loses traction. To the extent that this drawback can be avoided by the additional installation of a differential lock, such a differential lock signifies a further manufacturing and assembly effort, and hence an increase in costs. In addition, the overall size of the drive axle is increased.

It is therefore an object of the invention to avoid the aforementioned drawbacks of a drive axle having the aforementioned general features.

SUMMARY OF THE INVENTION

The basic concept of the invention is that disposed on the axle are two separately operating asynchronous motors, the operating performance of which is controlled by a common control means, and the motor shafts of the two asynchronous motors are respectively connected, via the planetary gearing stage, with the drive shaft that drives the following output shaft. The invention has the advantage that due to the elimination of the differential, the operating noises resulting therewith are reduced, whereby a simplification and standardization of the structural form and the required individual components for the drive axle are also provided. Even if one of the separately driven wheels loses traction, the vehicle equipped with the drive axle continues to move with half power, because the wheel that continues to have traction is furthermore directly driven by the drive motor associated with it. Due to the direct coupling of the planetary gearing stage, which is provided between the drive shaft and the motor shaft, with the motor shaft on the one hand and the drive shaft on the other hand, there results a large degree of freedom in the structural design of the ratio of this gearing stage; a greater output torque or a higher final speed can be achieved therewith. There is also the further advantage that while maintaining the output torque within the framework provided in the state of the art, larger wheel radii can be utilized, whereby the vehicles driven by the drive axle have a greater ground clearance.

To the extent that pursuant to one embodiment of the invention initially a single-stage design of the planetary gearing stage formed between motor shaft and drive shaft is proposed, the invention in particular provides for a multi-stage design of the planetary gearing stage. In this way a high overall ratio of up to 1:35 can be achieved, enabling motor speeds of up to 7000 rpm, whereby pursuant to the state of the art approximately 4500 rpm is standard.

To the extent that one embodiment of the invention provides that the gearbox of the planetary gearing stage disposed between motor shaft and drive shaft is disposed in the interior of the housing of the asynchronous motor, and carries the bearings for the motor shaft, there results in particular the possibility of undertaking the lubrication of the bearings of the motor shaft by means of the oil lubrication of the planetary gearing stage, whereby a further reduction in noise results and the oil temperature of the lubrication can be kept low. In particular, with the thereby resulting oil lubrication again a high motor speed can be achieved.

Alternatively, a grease-lubricated bearing can also be used for the lubrication of the bearings of the motor shaft, whereby such bearings today already permit speeds of up to 6000 rpm; however, such specialty bearings are expensive.

The type of construction of the inventive drive axle is expediently simplified if, pursuant to one embodiment of the invention, a common housing is provided for both asynchronous motors.

To the extent that the sun gear that is disposed on the motor shaft as part of the planetary gearing is also subjected to axial forces, which in a disadvantageous manner can lead to an axial displacement of the sun gear upon the motor shaft, it is proposed pursuant to an embodiment of the invention that the bearings for the motor shaft be embodied as bearings that absorb radial and axial forces, and that a bushing be disposed between the bearings and a sun gear that is disposed on the motor shaft and is part of the planetary gearing stage, whereby the bushing is supported on both sides against the bearings and the sun gear, and the sun gear is fixed in position against the bushing via a fastening means disposed on the free end of the motor shaft, and that the sun gear, and the planet pinions meshing therewith, are embodied as a helical toothing or gearing having a force component that acts in the direction of the bearings. Connected herewith is the advantage that due to the interposition of the bushing between sun gear and bearings for the motor shaft, the sun gear is fixed against displacement on the motor shaft. Axial forces that act upon the sun gear are now transferred with structural alignment, via the bushing, to the bearings for the motor shaft, which for this purpose are designed with a type of construction that in addition to accommodating the radial forces that are to be absorbed during the mounting of the motor shaft, in addition are suitable for absorbing axial forces. Since it is furthermore provided that the sun gear, and the planet pinions of the planetary gearing stage that mesh therewith, are embodied as a helical gearing having a force component that acts in the direction of the bearings for the motor shaft, axial forces that occur can be conveyed into the bearings in a desired manner.

One embodiment of the invention provides that the sun gear be supported directly against the bushing; alternatively, an indirect support of the sun gear against the bushing can be provided by disposing a spacer disk between bushing and sun gear.

To fix the sun gear in position, it is proposed pursuant to anembodiment of the invention that the fastening means fixes the sun gear with pre-stress against the bushing; this presumes an appropriate type of construction of the bearings for the motor shaft. However, the sun gear is preferably disposed between the bushing and the fastening means with a slight axial play.

BRIEF DESCRIPTION OF THE DRAWINGS

Embodiments of the invention are shown in the drawing, which will be explained subsequently. The drawings show.

DESCRIPTION OF SPECIFIC EMBODIMENTS

Figure 1:
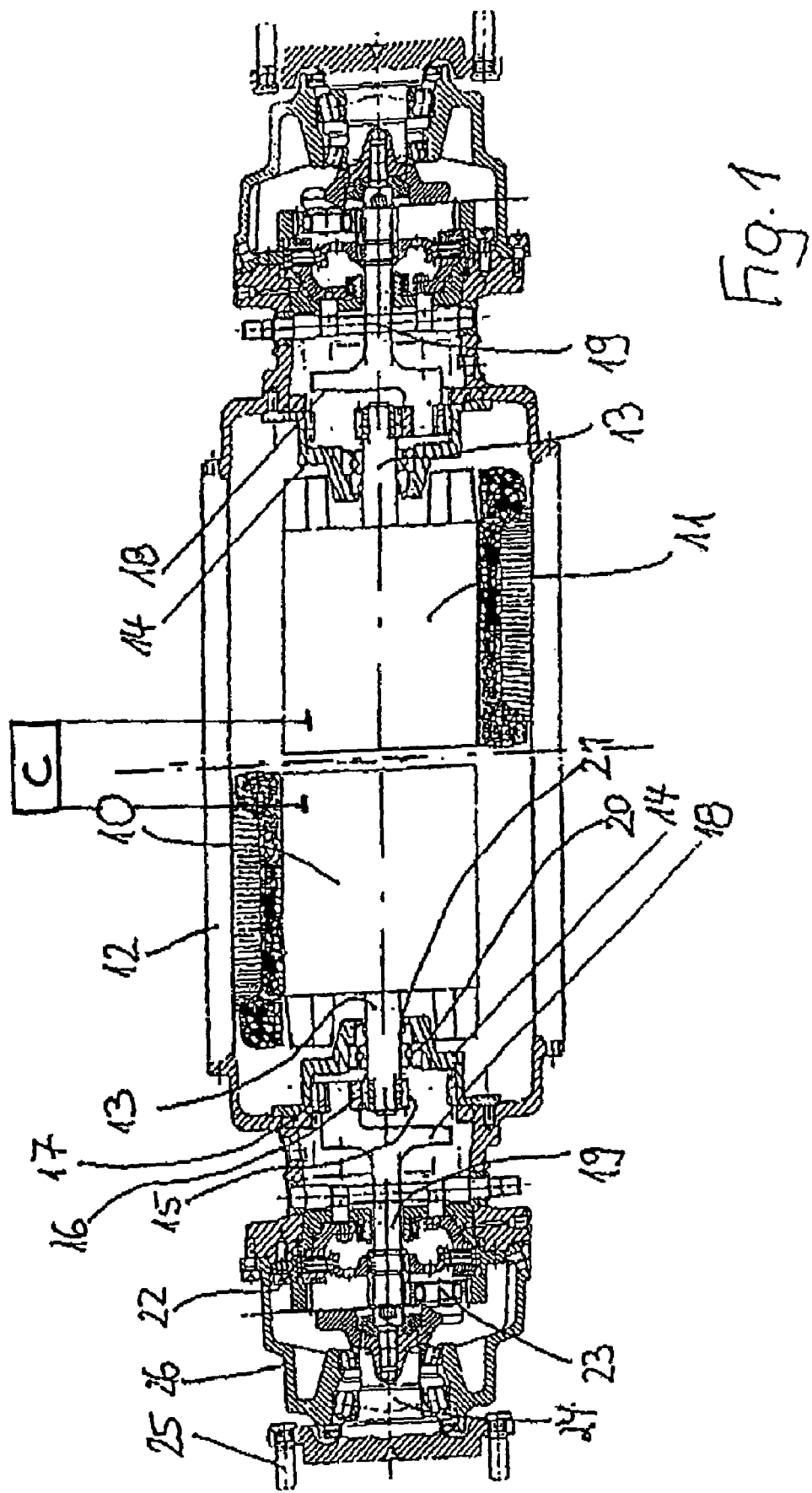
FIG. 1 a cross-sectioned side view of a drive axle.

Disposed in a common housing 12, which is connected with the chassis of the vehicle, are two asynchronous motors 10, 11 that are separate from one another, whereby each motor 10, 11, via a drive arrangement that will be described subsequently, drives an individual wheel that is disposed on the drive axle. The operating performances of the two asynchronous motors 10, 11 are controlled by a common control means C, whereby, for example, speed differences of the wheels that occur when traveling through curves are compensated for by the control means.

The motor shaft 13 of each individual asynchronous motor 10, 11 extends into a gearbox 14 of the gearing stage, which is provided for the connection of the motor shaft 13 with the downstream drive shaft 19, and which comprises a central or sun gear 15 disposed on the motor shaft 13, planet pinions 16 disposed on a planet carrier 18, as well as a hollow or internal toothing 17 formed on the inner side of the gearbox 14. The planet carrier 18, in turn, is connected with the drive shaft 19, with which is associated a spring-loaded multiple-disk brake assembly 22. Adjoining the spring-loaded multiple-disk brake assembly 22 is a single-stage planetary gearing 23 which gears down the speed of the drive shaft 19 into a rotation of a connected output shaft 24, whereby the output shaft 24 is provided with wheel bolts 25 for the mounting of the wheel rim. The assemblies 22, 23 are surrounded by an axle tube 26 as a housing part.

The configuration of the spring-loaded multiple-disk brake assembly 22 as well as of the planetary gearing 23 with the output shaft 24 can remain unaltered from the state of the art.

The connection of the respectively individual motor shafts 13 of the two asynchronous motors 10, 11 with the drive shaft 19 in the planetary gearing stage 15, 16, 17 provides the possibility of integrating the mounting of the motor shaft 13, and therewith the lubrication thereof, into the gearing stage. Thus, the gearbox 14, which is disposed in the interior of the common housing 12 of the two asynchronous motors 10, 11, is provided with the bearing 20 for the motor shaft 13, whereby disposed between the motor shaft 13 and the gearbox 14 is furthermore a sealing means 21. Thus, the oil lubrication present in the gearbox 14 is also available for the lubrication of the mounting of the motor shaft 13.

Figure 2:
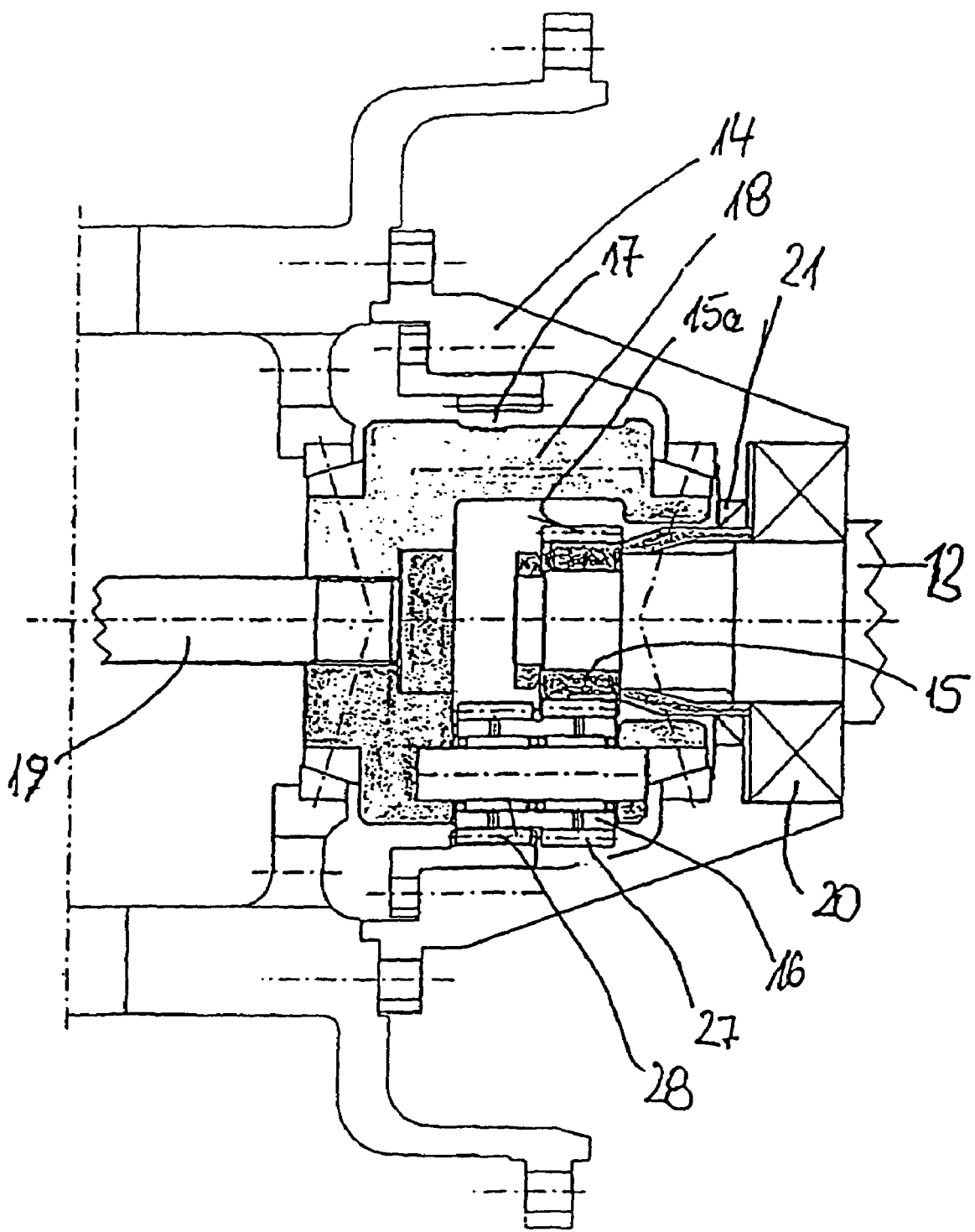
FIG. 2 an enlarged detailed illustration of the planetary gearing stage disposed between motor shaft and driveshaft and FIG. 3 the subject matter of FIG. 2 in another embodiment having a sun gear fixed against axial displacement.

As can be seen in greater detail in FIG. 2, the planetary gearing stage that is provided between the motor shaft 13 and the drive shaft 19 is embodied as a two-stage planetary gearing, whereby the planet pinions 16, which are driven by the sun gear 15, which is disposed on a motor shaft 13 and has the toothing 15a, are provided with two toothing regions having different number of teeth, namely a first toothing region 27, which meshes with the toothing 15a of the sun gear, and a second toothing region 28, which meshes with the internal toothing 17. Due to the rolling of the second toothing region 28 on the internal toothing 17, the planet carrier 18, with the drive shaft 19 connected thereon, is rotated with a corresponding gearing down relative to the motor shaft 13.

Figure 3:
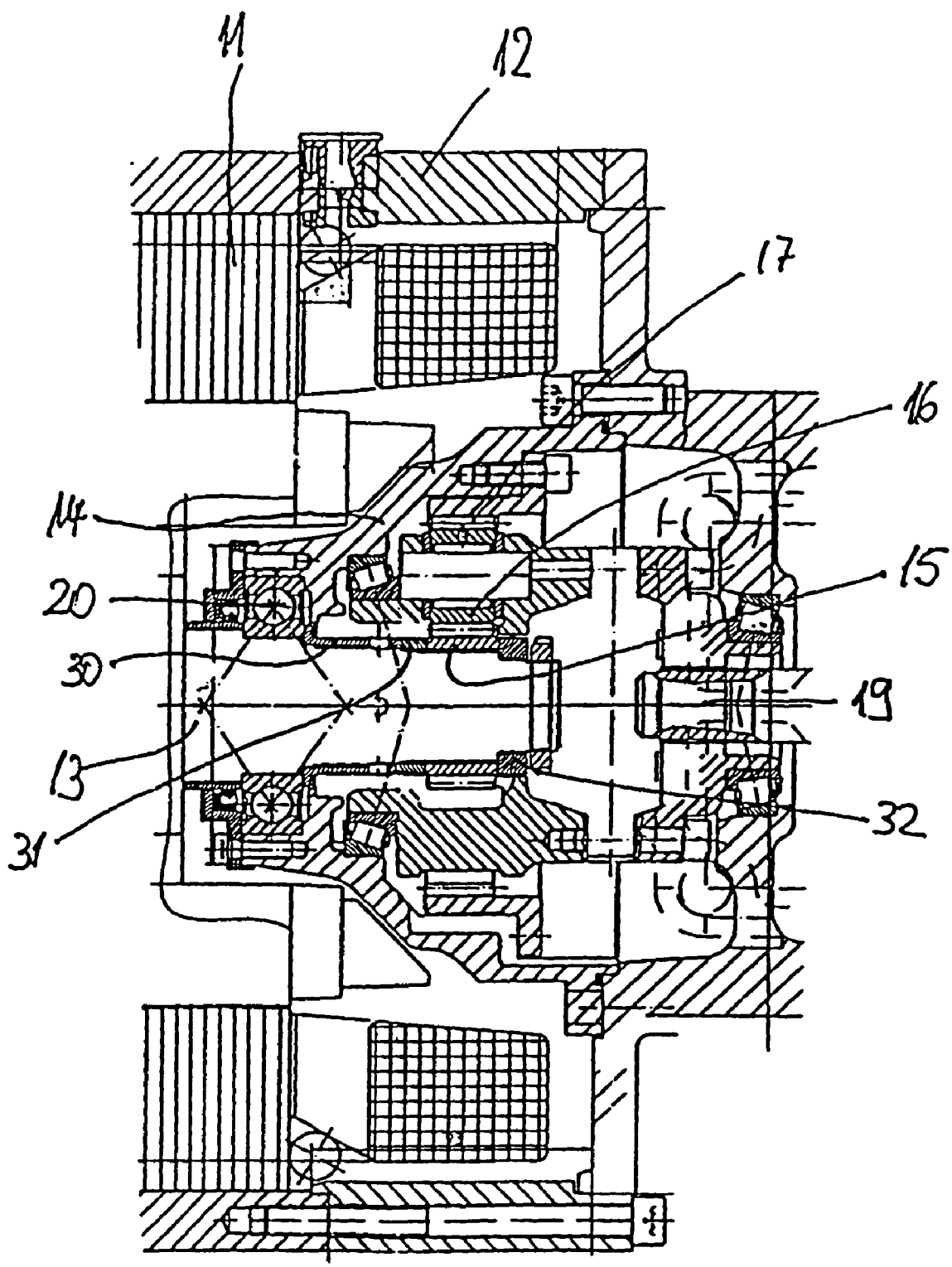

To the extent that with the embodiment illustrated in FIG. 3 a fixing of the sun gear 15 is provided, the bearings 20 for the motor shaft 13 have their type of construction designed such that in addition to the radial forces that are accommodated for the motor shaft mounting, axial forces are also absorbed and can be dissipated via the gearbox 14 into the axle housing. Disposed between the bearings 20 and the sun gear 15, on the motor shaft 13, are a bushing 30 as well as a spacer disk 31, which form an axial support for the sun gear 15 that adjoins the spacer disk 31; the sun gear 15 is fixed in position on the motor shaft 13 by a nut, as a fastening means 32, that is screwed onto the free end of the motor shaft 13. In the illustrated embodiment, the sun gear 15 is disposed with a slight axial play between its axial support against the spacer disk 31 and the fastening nut 32. Thus, if axial forces act upon the sun gear 15, these axial forces are transferred, from the bushing 30 and spacer disk 31 that support the sun gear 15 against the bearings 20 for the motor shaft 13, to the bearings 20, and here into the gearbox 14 or the axle housing.

The features of the subject matter of these documents disclosed in the preceding description, the patent claims and the drawing can be important individually as well as in any desired combination with one another for the realization of the various embodiments of the invention.

The specification incorporates by reference the disclosure of German priority documents 202 01 379.0 filed Jan. 31, 2002 and 202 13 670.1 filed Sep. 2, 2002 as well as PCT/DE03/00253 filed Jan. 30, 2003.

The present invention is, of course, in no way restricted to the specific disclosure of the specification and drawings, but also encompasses any modifications within the scope of the appended claims.

The invention claimed is:

1. A drive axle for an electric motor driven vehicle comprising:
   two separately operating asynchronous motors disposed on said axle and each having a motor shaft for driving a respective drive shaft;
   a respective planetary gearing stage interposed between each motor shaft and drive shaft, wherein each motor shaft is connected with a drive shaft by one of said planetary gearing stages;
   a respective output shaft driven by one of said drive shafts, and carrying wheels disposed on said drive axle, wherein interposed between said drive shaft and said output shaft is a brake assembly and a further planetary gearing; and
   a common control means for controlling an operating performance of said asynchronous motors.

2. A drive axle according to claim 1, wherein said planetary gearing stage disposed between said motor shaft and said drive shaft has a single-stage configuration.

3. A drive axle according to claim 1, wherein said planetary gearing stage disposed between said motor shaft and said drive shaft has a multi-stage configuration.

4. A drive axle according to claim 1, wherein said planetary gearing stage disposed between said motor shaft and said drive shaft is provided with a gearbox that is disposed within a housing of said asynchronous motor, wherein bearings are provided for said motor shaft, and wherein said bearings are carried by said gearbox.

5. A drive axle according to claim 4, wherein said bearings for said motor shaft are embodied as bearings that accommodate radial and axial forces, wherein a sun gear, as part of said planetary gearing stage, is disposed on said motor shaft, wherein a bushing is disposed between said bearings and said sun gear and is supported at opposite ends against said bearings and said sun gear, wherein a fastening means is disposed on a free end of said motor shaft, wherein said sun gear is fixed against said bushing via said fastening means, and wherein said sun gear, and planet pinions that mesh therewith, are embodied as a helical toothing or gearing having a force component that acts in the direction of said bearings.

6. A drive axle according to claim 5, wherein said sun gear is supported directly against said bushing.

7. A drive axle according to claim 5, wherein a spacer disk is disposed between said bushing and said sun gear.

8. A drive axle according to claim 5, wherein said fastening means fixes said sun gear with pre-stress against said bushing.

9. A drive axle according to claim 5, wherein said sun gear is disposed between said bushing and said fastening means with a slight axial play.

10. A drive axle according to claim 1, wherein bearings are provided for said motor shaft, and wherein a lubrication of said bearings is provided by an oil lubrication of said planetary gearing stage.

11. A drive axle according to claim 1, wherein bearings are provided for said motor shaft, and wherein said bearings are grease-lubricated bearings.

12. A drive axle according to claim 1, wherein a common housing is provided for said two asynchronous motors.

* * * * *

UNITED STATES PATENT AND TRADEMARK OFFICE
CERTIFICATE OF CORRECTION

PATENT NO. : 7,112,155 B2 Page 1 of 1
APPLICATION NO. : 10/503409
DATED : September 26, 2006
INVENTOR(S) : Keuth It is certified that error appears in the above-identified patent and that said Letters Patent is hereby corrected as shown below:

Title page & Col. 1 line 1,
Item [54] should read as follows:

[54]  DIRECTLY DRIVEN DRIVE AXLE HAVING TWO DRIVE MOTORS

Signed and Sealed this

Twentieth Day of February, 2007

JON W. DUDAS
*Director of the United States Patent and Trademark Office*